United States Patent
Oh et al.

(10) Patent No.: US 8,213,995 B2
(45) Date of Patent: Jul. 3, 2012

(54) INPUT PROCESSING METHOD OF MOBILE TERMINAL AND DEVICE FOR PERFORMING THE SAME

(75) Inventors: Jung Yeob Oh, Gyeonggi-do (KR); Jin Yong Kim, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 294 days.

(21) Appl. No.: 12/722,838

(22) Filed: Mar. 12, 2010

(65) Prior Publication Data

US 2010/0273529 A1   Oct. 28, 2010

(30) Foreign Application Priority Data

Apr. 22, 2009   (KR) .................. 10-2009-0035195

(51) Int. Cl.
*H04B 1/38* (2006.01)

(52) U.S. Cl. .................. 455/563; 455/566; 345/173

(58) Field of Classification Search ............... 455/550.1, 455/563, 566, 567, 575.1, 347, 351; 345/156, 345/169, 170, 172, 173
See application file for complete search history.

(56) References Cited

U.S. PATENT DOCUMENTS

| | | | |
|---|---|---|---|
| 2010/0004030 A1* | 1/2010 | Nam | 455/566 |
| 2010/0031203 A1* | 2/2010 | Morris et al. | 345/156 |
| 2010/0283735 A1* | 11/2010 | Kim et al. | 345/168 |
| 2011/0237301 A1* | 9/2011 | Patel et al. | 455/566 |

FOREIGN PATENT DOCUMENTS

| | | |
|---|---|---|
| KR | 2000-41690 | 7/2000 |
| KR | 2001-55043 | 7/2001 |
| KR | 2006-20101 | 3/2006 |

\* cited by examiner

*Primary Examiner* — Thanh Le
(74) *Attorney, Agent, or Firm* — Cha & Reiter, LLC

(57) ABSTRACT

An input processing method of a mobile terminal and a device performing the same are disclosed. Information on a user facility performed by a touch event generated at an area of the mobile terminal is compared with voice sensing data collected through a microphone to perform a specific user facility. As a result, erroneous touch event and imprecision generated during the voice sensing are improved.

20 Claims, 11 Drawing Sheets

INPUT PROCESSING METHOD OF MOBILE TERMINAL AND DEVICE FOR PERFORMING THE SAME

CLAIM OF PRIORITY

This application claims priority from Korean Patent Application No. 10-2009-0035195 filed Apr. 22, 2009, the contents of which are hereby incorporated by reference in its entirety.

BACKGROUND OF THE INVENTION

1. Field of the Invention

The present invention relates generally to a mobile terminal and, more particularly, to an input processing method of compensating a touch event and a voice sensing function in a mobile terminal to yield a more precise signal input, and an input processing device for performing the same.

2. Description of the Related Art

Mobile terminals support voice call function and are widely used in various fields for convenient use and easy mobility. Mobile terminals provide various inputting methods for ease of use. An existing mobile terminal provides a touch screen having a touch panel and a display unit such that the touch panel processes user manipulation for touching a specific image output on the display unit by a user to generate a corresponding touch event and controls an application program corresponding to a user facility based on the processing. However, the touch screen function of the existing mobile terminal is used only when the display unit can be viewed or by only a user. Moreover, the touch event processed by the touch panel is not precise so that a touch event demanded by a user may not be not correctly generated and applied.

SUMMARY OF THE INVENTION

The present invention provides an input processing method, performed in a mobile terminal, of removing imprecision of a touch function and a voice sensing function by operating respective elements of the mobile terminal and supporting a user to perform a desired correct input and to conveniently generate a specific input signal, and an input processing device using the same.

In accordance with an exemplary embodiment of the present invention, an input processing device of a mobile terminal includes: a touch panel for generating a touch event; a microphone for collecting a voice signal; a control unit for sensing the voice signal and generating voice sensing data, generating visual information text data to determine a user facility corresponding to the touch event, comparing the voice sensing data with the visual information text data to correct the voice sensing data, and comparing the visual information text data with the voice sensing data to correct the visual information text data; and a display unit outputting a screen corresponding to the user facility activated based on the corrected voice sensing data and the corrected visual information text data.

In accordance with an exemplary embodiment of the present invention, an input processing method of a mobile terminal includes: collecting a touch event and a voice signal; sensing the voice signal to generate voice sensing data; generating visual information text data to determine a user facility corresponding to the touch event; correcting the voice sensing data by comparing the voice sensing data with the visual information text data and correcting the visual information text data by comparing the visual information text data with the voice sensing data; and performing the user facility based on the corrected voice sensing data and the corrected visual information text data.

According to the input processing method and device of the present invention, operating precision of a user facility based on a touch function and a voice sensing function is improved and the user facility can be more conveniently and flexibly operated.

BRIEF DESCRIPTION OF THE DRAWINGS

The features and advantages of the present invention will be more apparent to those skilled in the art from the following detailed description in conjunction with the accompanying drawings, in which.

DETAILED DESCRIPTION

Hereinafter, exemplary embodiments of the present invention are described in detail with reference to the accompanying drawings. The same reference symbols are used throughout the drawings to refer to the same or like parts. For the purposes of clarity and simplicity, detailed descriptions of well-known functions and structures incorporated herein may be omitted to avoid obscuring the subject matter of the present invention.

Particular terms may be defined to describe the invention in the best manner. Accordingly, the meaning of specific terms or words used in the specification and the claims should not be limited to the literal or commonly employed sense, but should be construed in accordance with the spirit of the invention. The description of the various embodiments is to be construed as exemplary only and does not describe every possible instance of the invention. Therefore, it should be understood that various changes may be made and equivalents may be substituted for elements of the invention.

Hereinafter, visual information text data are generated by a touch event and may be characters or numbers corresponding to a text input, or command data for activating a user facility. Voice sensing data, in which voice is sensed based on collected voice signals, may be sensing data for inputting text or command data for activating the user facility.

Figure 1:
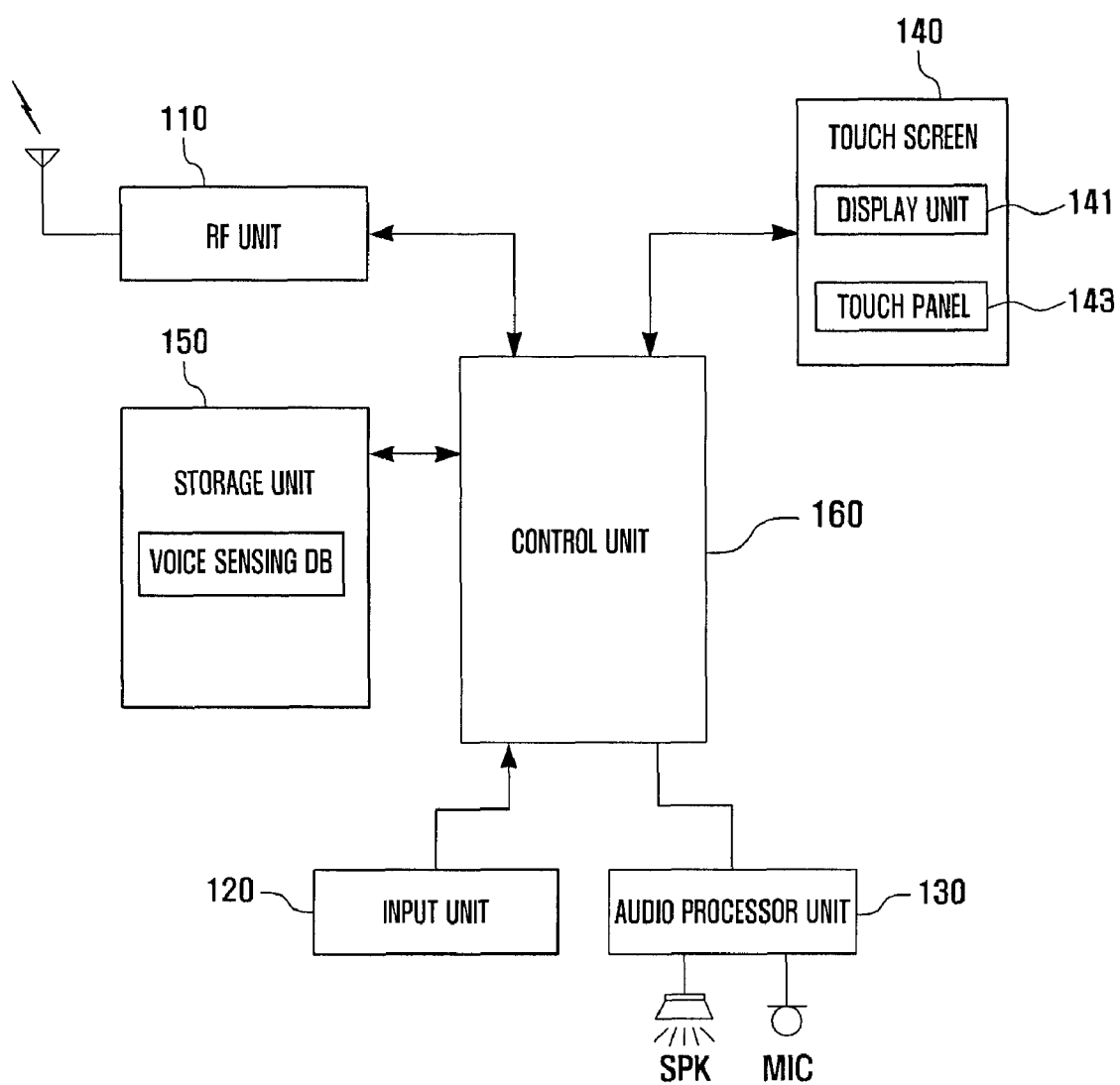
FIG. 1 is a schematic block diagram illustrating a configuration of a mobile terminal according to an exemplary embodiment of the present invention.

FIG. 1 is a schematic block diagram illustrating a configuration of a mobile terminal according to an exemplary embodiment of the present invention.

Referring to FIG. 1, a mobile terminal 100 according to an exemplary embodiment of the present invention includes a radio frequency (RF) unit 110, an input unit 120, an audio processor unit 130, a touch screen 140, a storage unit 150 and a control unit 160.

The mobile terminal 100 having the configuration may manage a function of sensing voice collected through a microphone that is provided in the audio processor unit 130 and converting the collected voice into text, a function of outputting preset voice information stored in the storage unit 150 through a speaker, and a user facility performed by a touch event collected through the touch screen 140, simultaneously or sequentially to enhance a precision of voice sensing data based on the touch event and the ease of use of the touch event based on the voice sensing data so that a more precise input signal can be generated and control of the user facility can be provided. Hereinafter, the elements of the mobile terminal 100 will be described in detail.

The RF unit 110 generates communication channels for voice communication and for transmission of data such as an image under the control of the control unit 160. That is, the RF unit 110 generates a voice communication channel, a data communication channel, and a video communication channel between mobile communication systems. To this end, the RF unit 110 may include an RF transmitter for performing up-conversion and amplifying frequency of a transmitting signal and an RF receiver for performing low-noise amplification of a received signal and performing down-conversion of frequency of the received signal. The RF unit 110 may be selected by the control unit 160 according to a touch event generated by a touch panel 143 and may be activated based on the voice sensing data generated by sensing voice during the selection. That is, the RF unit 110 maybe activated or inactivated based on the touch event and the voice sensing. For example, when a specific touch event is generated from the touch panel 143, and at the same time or after that, preset voice sensing data are collected within a preset time, the RF unit 110 may request a call based on a preset or input telephone number or answer a received call.

The input unit 120 includes a plurality of input keys and function keys for receiving number information or text information and setting various functions. The function keys may include an arrow key, a side key, and a short key for performing specific functions. The input unit 120 generates a key signal in connection with user setting and function control of the mobile terminal 100 and transmits the generated key signal to the control unit 160. The input unit 120 may be implemented by a QWERTY keypad, a 3*4 keypad, or a 4*3 keypad having a plurality of keys. The input unit 120 may be replaced with a touch screen 140 when the touch screen 140 of the mobile terminal 100 is implemented by a full touch screen.

The audio processor unit 130 includes a speaker SPK for reproducing audio data transmitted and received for the call and a microphone MIC for collecting user voice and other audio signals during the call. The voice signal collected by the microphone MIC may be directly sensed as a voice by the control unit 160 according to whether a voice sensing function is set. The speaker SPK may output specific voice information stored in the storage unit 150 as an audio signal under the control of the control unit 160. For example, when vocal information explaining a specific user facility is provided and a corresponding user facility is assigned by a touch event, the speaker SPK may convert the vocal information into an audio signal to output.

The touch screen 140 includes a display unit 141 and a touch panel 143. The touch screen 140 is configured such that the touch panel 143 is disposed on the front side of the display unit 141. The touch screen 140 may have the same size as that of the touch panel 143.

In a preferred embodiment of the present invention, the display unit 141 displays various menus of the mobile terminal 100 and information including input by a user and to be provided to the user. That is, the display unit 41 provides a plurality of screens generated when using the mobile terminal 100, including a standby screen, a menu screen, a message composing screen and a call screen. The display unit 141 divides an entire displaying area into a plurality of divisional displaying areas each having a preset size and provides one of icons and images corresponding to the user facility on the plurality of divisional displaying areas. For example, when the mobile terminal 100 provides a widget function and a message alarming function, the display unit 141 divides the displaying area into a first and a second divisional displaying area, and outputs at least one widget icon corresponding to the widget function on the first divisional displaying area and one of an image and an icon corresponding to the message alarming function on the second divisional displaying area. The display unit 141 comprises a liquid crystal display (LCD), and an organic light emitting diode (OLED). The display unit 141 has a size less than that of the touch panel 143 and is disposed under the touch panel 143.

In an exemplary embodiment of the present invention, the touch panel 143 is disposed to cover the display unit 141, and generates a touch event according to one of a contact by and a distance from an object to transmit the touch event to the control unit 160. In this case, the touch panel 143 is a matrix detection type and transmits a position information of a touch event generated on the touch panel 13 and a type information of the touch event to the control unit 160. The control unit 160 checks the position and type of the touch event transmitted from the touch panel 143 and maps a specific image the position, and controls the display unit 141 to activate a user facility linked to the image. Operation of the touch panel 143 will be described in detail later.

In a preferred embodiment of the present invention, the storage unit 150 stores an application program required to operate each function employed in the exemplary embodiment of the present invention and one of a key map and a menu map for operating the touch screen when the mobile terminal 100 includes a touch screen. There can be a plurality of types of key maps and menu maps. That is, the key map may be a keyboard map, a 3*4 key map, a qwerty key map, and an application control key map for controlling a currently activated application program. The menu map can be one of a menu map for controlling the currently activated application program and a menu map having a plurality of items provided by the mobile terminal 100. The storage unit 150 includes a program region and a data region.

The program region stores an operating system (OS) for booting the mobile terminal 100 and operating the above-mentioned units and an application program reproducing a plurality of files, including an application program supporting a call function, a web browser accessing to Internet, an MP3 application program reproducing an MP3 file and other music files, an image outputting application program reproducing a picture and an image, and a moving picture reproducing application program according to the functions supported by the mobile terminal 100. The program region stores a touch operating program supporting a touch function, a voice sensing program supporting a voice sensing function, and a multiple input application program based on both the touch function and the voice sensing function. The multiple input application program substantially manages the touch function application program and the voice sensing application program in a multiple way, and includes a routine for simultaneously managing the touch event transmitted from the touch function application program and the voice sensing data transmitted from the voice sensing application program. The application programs stored in the program region can be executed in a multiple input mode of the touch function and the voice sensing function, and a touch function mode, and a voice sensing function mode.

The data region in which data generated when the mobile terminal 100 is used is stored and includes phonebook information, at least one icon for performing the widget function, and a plurality of types of content. The data region, when the display unit 141 is a touch screen, can store a user input that is input through the touch screen. The data region includes a voice sensing database required to sense voice-sensed words.

Figure 2:
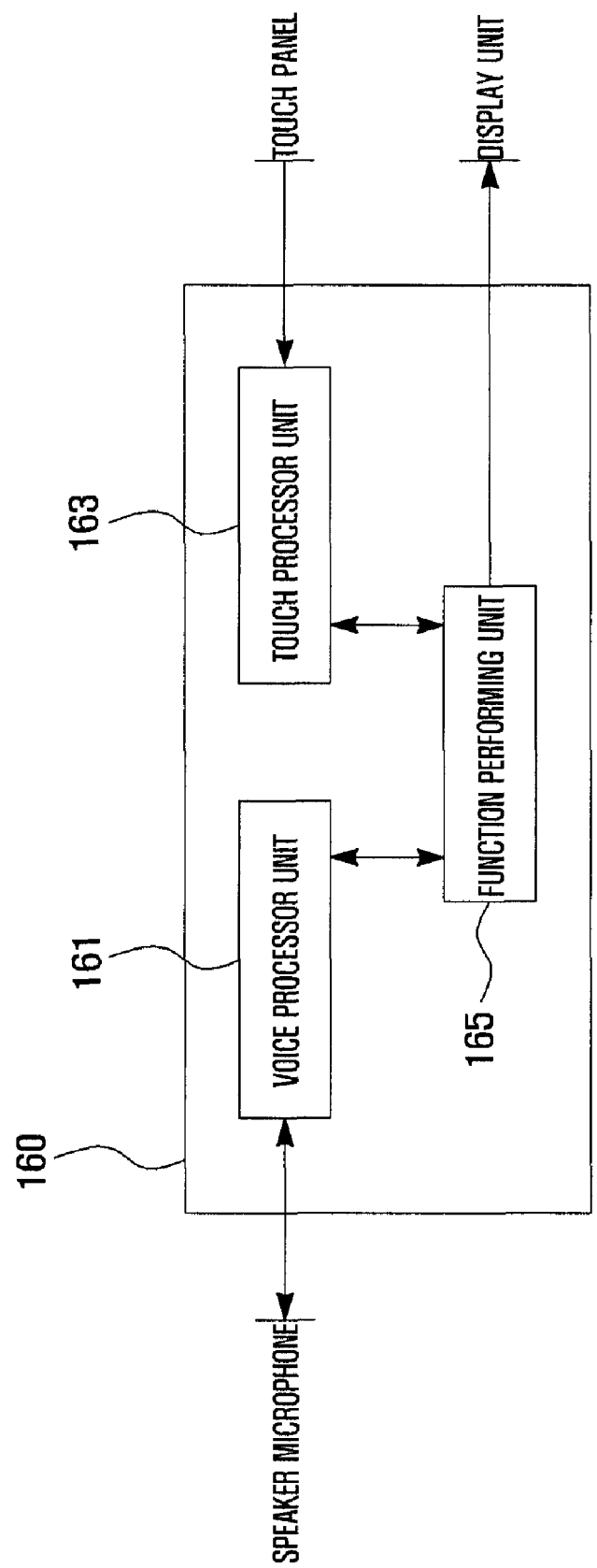
FIG. 2 is a detailed block diagram illustrating a control unit of FIG. 1.

The control unit 160 controls a power supply to the respective elements of the mobile terminal 100 for performing initialization of the mobile terminal 100 and signal flow to multiply manage the touch function and the voice sensing function when the initialization is completed. To this end, the control unit 160, as illustrated in FIG. 2, includes a voice processor unit 161, a touch processor unit 163, and a function performing unit 165, in an exemplary embodiment of the present invention.

The voice processor unit 161 controls the audio processor unit 130 to sense voice collected by the microphone MIC as voice based on the voice sensing database stored in the storage unit 150. The voice processor unit 161 transmits the voice sensing data to the function performing unit 165. The voice processor unit 161 controls the audio processor unit 130 to output the voice data transmitted from the function performing unit 165 through the speaker SPK of the audio processor unit 130. The voice processor unit 161 manages at least one voice sensing algorithm. For example, in a voice sensing algorithm applied by the voice processor unit 161, a voice signal received by the microphone MIC is sampled at 16 kHz and quantized with 16 bits to be stored. The quantized voice data is emphasized by a preset transfer function in advance and is multiplied by Hamming window of 25 ms to be analyzed while moving every 10 ms. By doing so, a total 39 order voice characteristic parameter including a difference between a first order component and a second order component can be applied to a twelfth order LPC-MEL spectrum coefficient and normalized algebra energy. A voice sensing model to which the characteristic parameter is applied employs a method of generating a phoneme decision tree at every state position of the model and learning state sequence of a context dependent acoustic model using learning acoustic data by successive state splitting (SSS). Since this method is fast in performing state splitting, state is selected and split by the SSS simultaneously with splitting entire splittable state and state having maximum likelihood may be selected. The voice processor unit 161 employs a hidden Markov network as an acoustic model. The voice processor unit 161 applies a method of analyzing voice wave based on a plurality of algorithms to extract and splitting a voice band where a vowel is characterized or characteristic equivalent thereto. The voice processor unit 161 applies a plurality of voice sensing algorithms in addition to the above-mentioned voice sensing algorithm.

The touch processor unit 163 transmits a touch event and position information, transmitted from the touch panel 143 to the function performing unit 165. In this case, the touch processor unit 163 determines which user function is assigned to the display unit 141 or selected based on a type of the touch event and the position information and transmits the determined results to the function performing unit 165. That is, the touch processor unit 163 determines whether the touch event is one of a touch down event, a touch up event, a touch drag event, and a flick event, and transmits information on the touch event and position information where a corresponding touch event is generated to the function performing unit 165. When the touch event is an event in which a touch moves a preset distance or longer on the touch panel 143 such as a touch drag event and a flick event, the touch processor unit 163 provides position information on a path of the movement.

In a preferred embodiment, the function performing unit 165 controls the voice processor unit 161 and the touch processor unit 163 to process voice sensing data and a touch event respectively according to a mode of the mobile terminal 100. In a mode where only voice sensing function is performed, the function performing unit 165 processes the transmitted voice sensing data independent from the touch function. Like this, in a mode where only touch function is performing, the function performing unit 165 processes the transmitted touch event independently from the voice sensing data. When the function performing unit 165 is set to process the touch function and the voice sensing function together, the function performing unit 165 checks whether the voice sensing data is transmitted within a preset time of when the touch event is transmitted and stores the transmitted touch event temporally. In other words, when a touch event, for example, one of event information on a text input, a user facility assignment, or a user facility selection is received from the touch processor unit 163, the function performing unit 165 determines whether to perform the touch function based on a mode of the mobile terminal 100 directly or in combination with the voice sensing data transmitted from the voice processor unit 161. When a mode is set to process the touch function and the voice sensing function together, the function performing unit 165 processes the touch event and the voice sensing data respectively transmitted from the touch processor unit 163 and the voice processor unit 161 together. In such a multiple mode, the function performing unit 165 checks whether a touch event is transmitted within a preset time after voice sensing data is transmitted and controls the user facility by processing the voice sensing data with the touch event when the touch event is transmitted within the preset time. In this case, the function performing unit 165 uses one of a buffer, assigned by the storage unit 150, for storing the touch event and the voice sensing data temporally and a memory provided in the control unit 160.

When a touch event is received from the touch processor unit 163, the function performing unit 165 checks whether the touch event assigns a specific user facility and may checks whether voice information is set to the specific user facility when the touch event assigns the specific user facility. When there is voice information corresponding to the user facility, the function performing unit 165 transmits the voice information to the voice processor unit 161 and controls the voice processor unit 161 to convert and output the voice information into an audio signal using the audio processor unit 130.

Management of the mobile terminal 100 carried out by the function performing unit 165 will be described with a flowchart and exemplary embodiments having exemplary screens in detail below.

Figure 3:
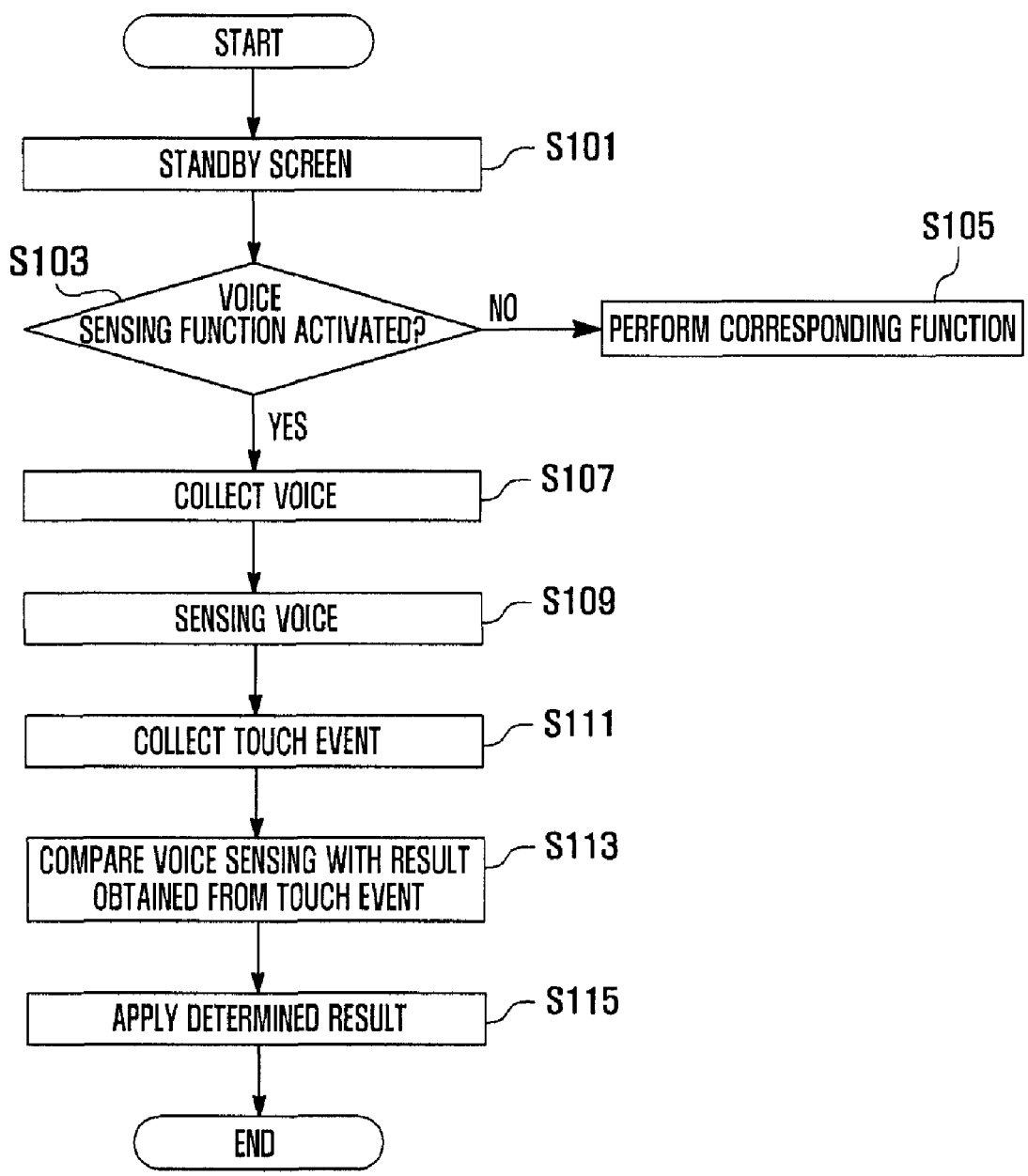
FIG. 3 is a flowchart illustrating an inputting method of a mobile terminal according to an exemplary embodiment of the present invention.

FIG. 3 is a flowchart illustrating an inputting method of a mobile terminal according to an exemplary embodiment of the present invention.

Referring to FIG. 1, when electric power is supplied, the mobile terminal 100 initiates respective elements and outputs a preset standby screen on the display unit 141 when the initialization is completed (S101). In this case, the mobile terminal 100 outputs the standby screen on the display unit 141 even when the mobile terminal 100 is a sleep state because the mobile terminal 100 has not been used for a preset time and is activated again. When the display unit 141 is activated, the mobile terminal 100 activates the touch panel 143 according to a user setting to prepare to sense a user touch.

Next, the mobile terminal 100 checks whether or not a voice sensing function is activated (S103). When the voice sensing function is not activated, the mobile terminal 100 performs a user facility of the mobile terminal 100 such as a call function, a message composing function, and a file reproducing function according to an input signal input by a user, for example, a touch event transmitted from the activated touch panel 143 (S105).

Meanwhile, when the voice sensing function is activated or an input signal for activating the voice sensing function is transmitted (S103), the mobile terminal 100 collects voice (S107). In this case, a user of the mobile terminal 100 generates a voice signal through the microphone MIC of the mobile terminal 100. Then, the mobile terminal 100 performs the voice sensing function with respect to the voice signal using the above-mentioned voice sensing algorithms. When the voice sensing is completed, the mobile terminal 100 generates voice sensing data based on the voice sensing. The voice sensing data can be text information. When the sensed voice is not correct, the mobile terminal 100 sets a plurality of voice sensing data as candidates for the voice sensing results. For example, when a user pronounces "Thank you", the mobile terminal 100 can set "Thank you", "Thunk kou", "Thank kou", etc. as candidates.

Next, the mobile terminal 100 collects touch events generated from the touch panel 143 (S111). To this end, a user of the mobile terminal 100 touches the touch panel 143 using any one of his/her finger, a stylus pen, and other tool. The mobile terminal 100 performs the voice sensing and determines a touch event generated at the touch panel 143 within a preset time as an available touch event required for multiple operation. That is, when the touch event is generated after the preset time has been lapsed, the mobile terminal 100 makes the generated voice sensing and the touch event generated thereafter void or to be processed independently.

When touch events are collected from the touch panel 143, the mobile terminal 100 compares the voice sensing with results of the touch events to produce an appropriate result (S113). That is, the mobile terminal 100 selects a result in which text information corresponding to the voice sensing data is matched with information sensed from the touch event. Candidates of the voice sensing data among the above-mentioned example are provided, and the mobile terminal 100 determines whether there is a most similar information with the information sensed from the touch events among the candidates of the voice sensing data. The mobile terminal 100 controls a current user facility of the mobile terminal 100 with reference to the result obtained by comparing the voice sensing with the touch event (S115).

The multiple operations of the touch function and the voice sensing function in the above-mentioned exemplary embodiment of the present invention will be described with reference to FIG. 4, in detail.

Figure 4:
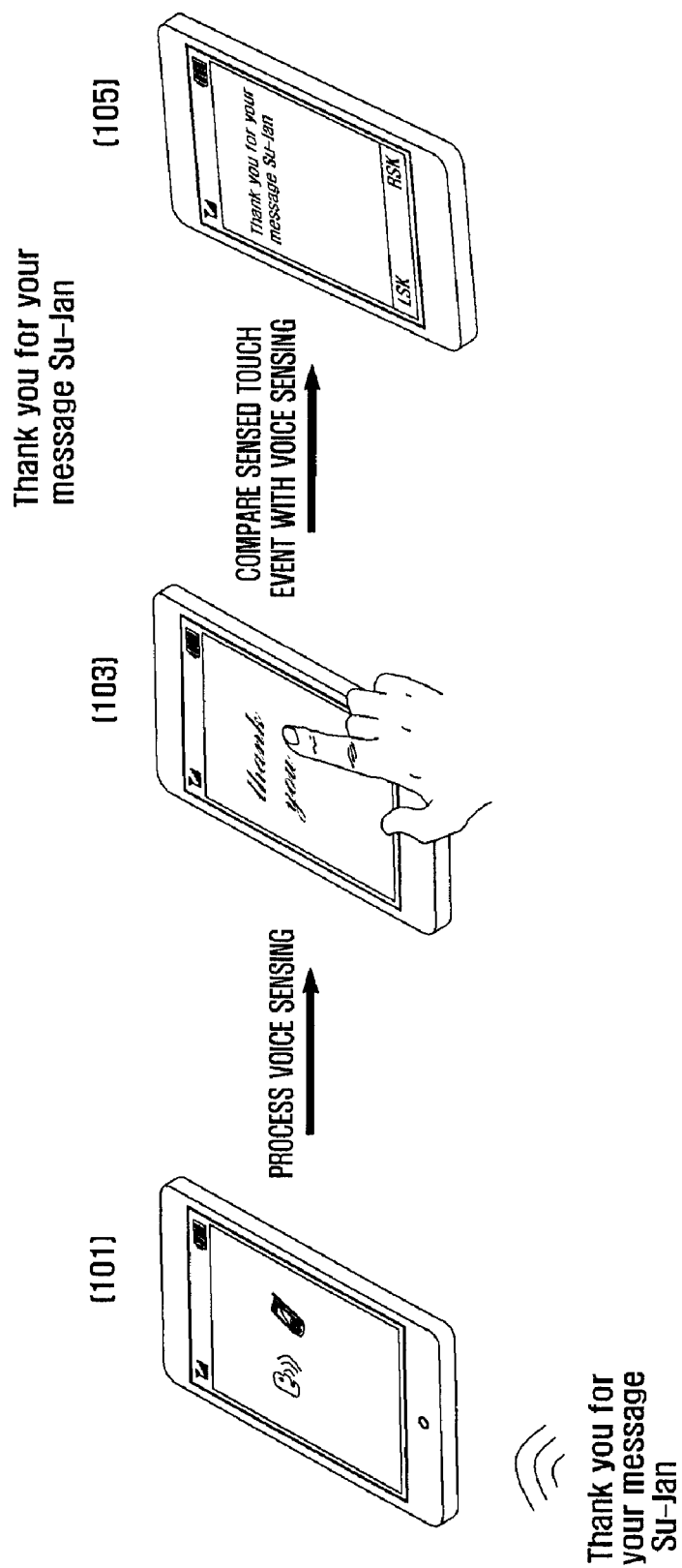
FIG. 4 is an exemplary screen illustrating an inputting method of a mobile terminal according to an exemplary embodiment of the present invention.

FIG. 4 shows an exemplary screen illustrating a multiple operation of a touch function and a voice sensing function according to an exemplary embodiment of the present invention.

Prior to description, hereinafter a user facility of a mobile terminal will be described by considering a text inputting function as an example.

Referring to FIG. 4, a user of the mobile terminal 100 sets a mode for the multiple operation of the voice sensing function and the touch function after the mobile terminal is powered on. Then, the mobile terminal 100, as shown in a screen 101, activates the voice sensing function according to a mode setting. In this case, the mobile terminal 100 outputs an image indicating that the voice sensing function is currently activated on the display unit 141. The image displayed on the display unit 141 may be omitted by one of a user setting or a designer's intent. A user of the mobile terminal 10 may provide a preset voice signal, for example, "Thank you for your message Su-jan" to an area where the microphone MIC of the mobile terminal 100 is positioned. Then, the mobile terminal 100 collects the voice signal using the microphone and performs the voice sensing with respect to the collected voice signal using the stored voice sensing algorithm. During the processing, the mobile terminal 100 generates candidates for the voice sensing data. In other words, the mobile terminal 100 may not correctly sense a specific voice signal. In this case, the mobile terminal selects a phoneme or a syllable similar to the voice signal from the voice sensing database in order to improve voice sensibility, wherein a plurality of similar phonemes or syllables may be selected. The mobile terminal 100 may construct an existing word based on the sensed phonemes or syllables by referring the voice sensing database. In this case, when a plurality of phonemes or syllables is selected with respect to a specific voice signal, a plurality of words may be selected. The mobile terminal 100 may select the plurality of words or a sentence based on the words as candidates of the voice sensing data. The mobile terminal 100 may not select candidates of the voice sensing data but may select one specific voice sensing data based on a set algorithm even when an error is generated.

After that, the user of the mobile terminal 100, as shown in a screen 103, generates a touch event for inputting a visual information text input using an object selected from the group consisting of a stylus pen, a finger, and other tool to touch the touch panel 143. To this end, the user may activate a text input window of the mobile terminal 100. The user may input visual information, that is, a text by keeping a preset direct ion and distance while continuously generating a touch movement or a touch drag signal after touching the touch panel 143 with a finger. The visual information includes a plurality of types of patterns, pictures, symbols, images, letters, numbers, and icons, and the user may input various information included in the visual information through the touch panel 143. Hereinafter, for the convenience of description, it is assumed that the user inputs text corresponding to a specific letter or number on the touch panel 143. The mobile terminal 100 collects touch event information input by the user and determined whether a corresponding touch event is matched with a specific text. The mobile terminal 100 determines what letter the touch event generated at a text input window form. For the determination, the mobile terminal 100 prepares a text database used as a reference to determine the touch events collected from the touch panel 143 as a text. That is, when the touch events collected from the touch panel 143 forms a certain letter, the mobile terminal 100 determines which of a letter and number a corresponding letter is matched with by referring to the text database. When the touch event-based text sensing is completed and the text data is generated, the mobile terminal 100 compares the voice sensing data as illustrated in the screen 101 with the text data as illustrated in the screen 103 . Information stored in the text database is not limited to text corresponding to specific letters or numbers. That is, the text database store a plurality of visual information including various letters, numbers, symbols, pictures, patterns, and icons, and the mobile terminal 100 determine which visual information or text of the text database a touch event sensed by the touch panel 143 corresponds to.

During the comparison, the mobile terminal 100 selects the most similar data to the text data sensed by the touch event from the candidates of the voice sensing data and outputs the selected data on the display unit 141 as illustrated in a screen 105. The selection of the most similar data is made by comparing letters or numbers existing in the candidates of the voice sensing data with the text data to select a word or a sentence including the largest number of identical letters or numbers. Similar to the voice sensing, in sensing a letter based on the touch event, the letter sensed by the touch event may be a plurality of types. For example, although a user generates a touch event for inputting a letter corresponding to 'a', the mobile terminal 100 may sense the touch event as 'u' or 'o'. Thus, the touch event may select a plurality of words as text data candidates during the letter sensing from the text database. After that, the mobile terminal 100 may compare the voice sensing data candidates with the text data candidates and may select a highly similar word or a sentence from the compared results. When only one voice sensing data is selected, the mobile terminal 100 selects the most similar text data from the text data candidates based on the selected voice sensing data. Consequently, the mobile terminal increase precision of the voice sensing data based on the text data sensed from the touch panel 143 or precision of the text data sensed from the touch panel 143 based on the voice sensing data. In more detail, it is difficult, in case of voice sensing, to sense precise voice due to various circumstance effects such as ambient noise and other voice waves sensing, and it is difficult, in case of text input, to sense precise text because users of mobile terminals have various writing habits, for example, handwritings. In this situation, the mobile terminal 100 may improve precision of the voice sensing function and the touch function by comparing the voice sensing data with the text data sensed by the touch event and selecting a phoneme, a syllable, a word, or a sentence having the most similarity.

Figure 5:
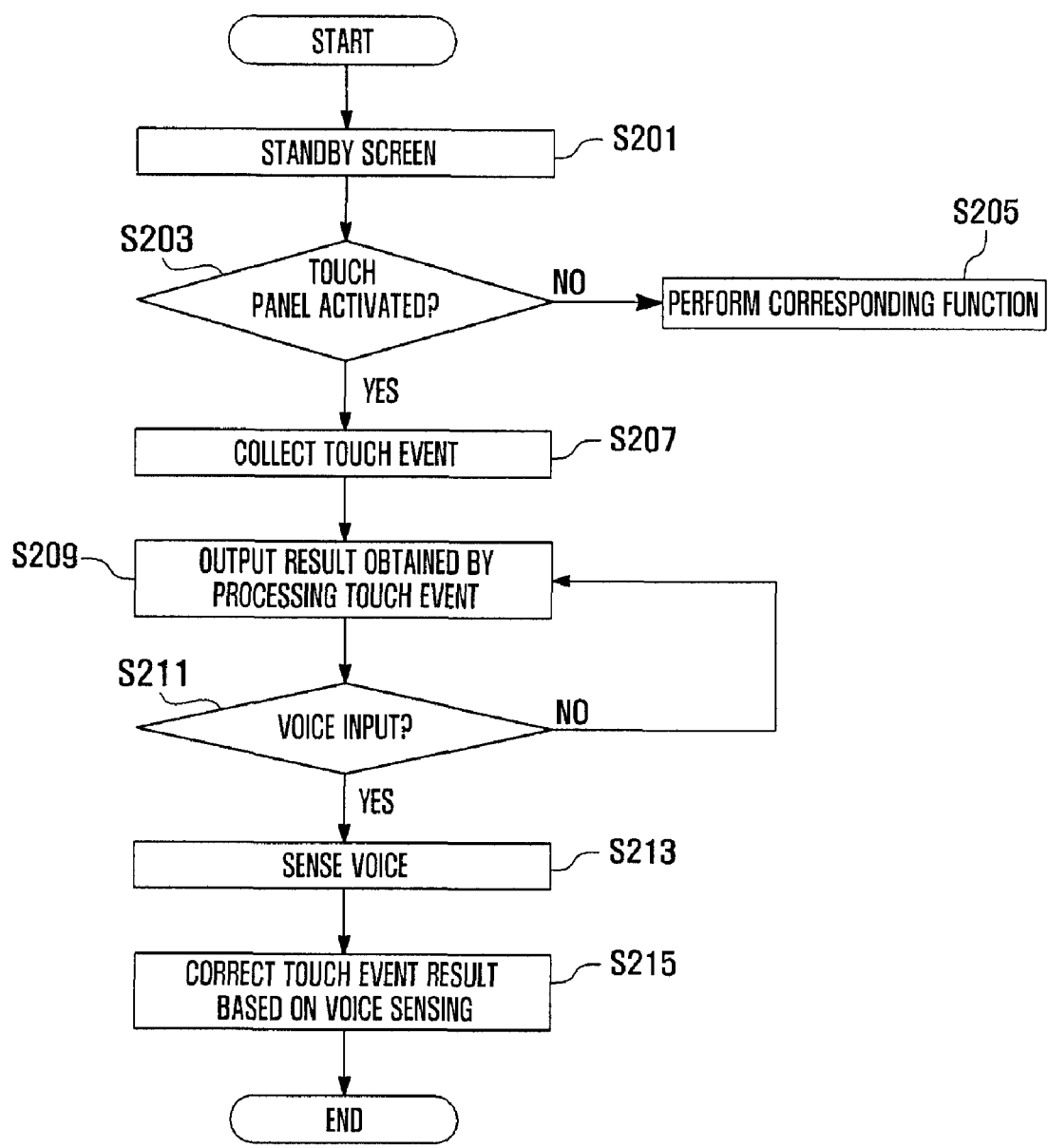
FIG. 5 is a flowchart illustrating an inputting method of a mobile terminal according to another exemplary embodiment of the present invention.

FIG. 5 is a flowchart illustrating an operation of a mobile terminal using an inputting method of a mobile terminal according to another exemplary embodiment of the present invention.

Referring to FIG. 5, when electric power is supplied, a mobile terminal 100 initiates respective elements of the mobile terminal 100 and outputs a preset standby screen on the display unit 141 after the initialization (S201) is completed. In this case, the mobile terminal 100 outputs the standby screen on the display unit 141 even when the mobile terminal 100 is a sleep state because the mobile terminal 100 has not been used for a preset time and is activated again.

Next, the mobile terminal 100 checks whether the touch panel 143 is activated (S203). In a case where the mobile terminal 100 is provided with a touch screen, since the touch panel is automatically activated after the initialization or when a standby screen is output, step S203 maybe omitted. When the automatic activation of the touch panel is not set or the touch panel is needs to be activated, a user of the mobile terminal 100 transmits an input signal to activate the touch panel using an input unit . When there is no signal for activating the touch panel, the mobile terminal 100 performs a user facility, for example, various functions provided by the mobile terminal 100 selected from the group including a file reproducing function, a camera function, and a broadcast receiving function according to an input signal transmitted from the input unit (S205).

When the touch panel is activated (S203), the mobile terminal 100 collects touch events generated by touch on the touch panel (S207). To this end, the user may generate on the touch panel with a finger.

When the touch events are collected, the mobile terminal 100 processes a corresponding touch event and outputs the processed result (s209). In more detail, the mobile terminal 100 checks what letter or number the corresponding touch event indicates when the touch event is to input a specific text. For the checking, the mobile terminal 100, as described above, may refer to the text database. When the touch event is generated on a specific image or at a specific area of the display unit to which an input signal to activate a user facility corresponds, the mobile terminal transmits information on which the corresponding touch event is assigned to or selects a specific image or an area of the display unit to the function performing unit. To this end, the mobile terminal 100 includes text data defining a specific image of the display unit 141. By doing so, the mobile terminal 100 prepares text data candidates for an image output on the display unit 141 with respect to a result of the touch event . For example, in the assignment of a specific image or an area of the display unit 141, the mobile terminal 100 sets a plurality of corresponding areas as the text data candidates when a plurality of areas is selected due to shaking or other incorrect motion or a touch event approaching a specific image area is generated. Alternately, although a specific image area is not correctly touched, other image areas near the area where the touch event is generated may be set as the text data candidate. The mobile terminal 100 generates the text data candidates for a touch event corresponding to the writing of letters or numbers.

Next, the mobile terminal 100 checks whether voice is input (S211). When voice is not input, the mobile terminal 100 output a processing result of the touch event (S209). The mobile terminal 100 automatically activates the voice sensing function before, during, or after performing step S209. That is, the mobile terminal 100 activates the voice sensing function before performing step S211.

When voice is input (S211), the mobile terminal 100 performs the voice sensing with respect to the input voice (S213). In this case, the mobile terminal 100 performs the voice sensing to the input voice in a phoneme, a syllable, a word, a phrase, and a sentence and transmits voice-sensed data to the function performing unit 165. The mobile terminal 100 makes various voice sensing data candidates for incomplete voice sensing.

Next, the mobile terminal 100 compares the text data candidates with the voice sensing data candidates to select data having the most similarity and controls a user facility according to a corresponding result. For example, when a touch event result is a text input for inputting a specific letter or number, the mobile terminal 100 corrects a part of the input text where a typing error is generated based on the voice sensing data. The mobile terminal 100 selects an image very similar to the voice sensing data from the text data candidates defining an image on the display unit 141. For example, when a user selects a first area and a second area of an image on the display unit 141 duplicately, the mobile terminal 100 stores text information on the first and second area as the text data candidates, determines that the user desires to select the first area when voice sensing data corresponding to the first area is sensed, and performs a user facility corresponding to the first area.

In the above description, although the voice sensing data candidates and the text data candidates are set, compared with each other, and data having the most similarity is selected, the mobile terminal 100 may handle the text data candidates without setting the voice sensing data candidates or vice versa. This will be described with reference to FIG. 6 in detail.

Figure 6:
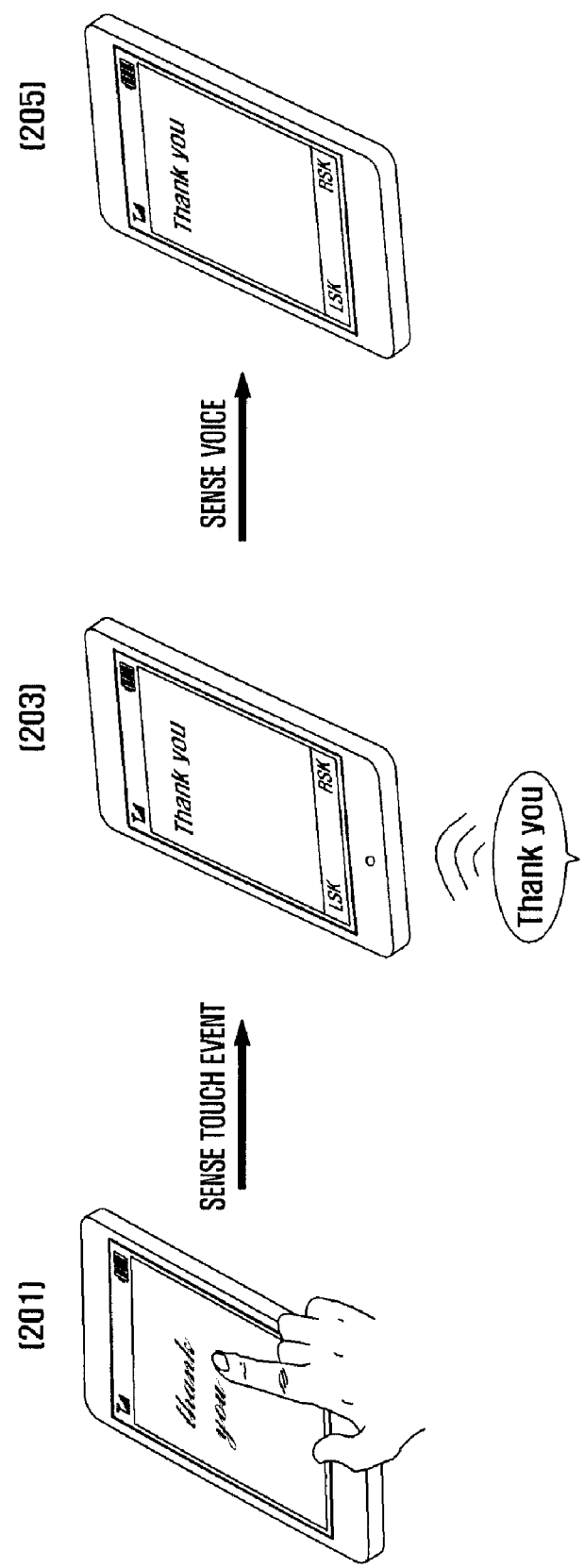
FIG. 6 is an exemplary screen illustrating an inputting method of a mobile terminal according to a further exemplary embodiment of the present invention.

FIG. 6 shows an exemplary screen illustrating an inputting method of a mobile terminal according to another exemplary embodiment of the present invention. Hereinafter, a text inputting function of a mobile terminal will be described. The text inputting function corresponds to a part of user facilities of a mobile terminal selected from the group consisting of a function of composing a message or an e-mail message, a scheduling function, and a file-naming function.

Referring to FIG. 6, a user of a mobile terminal 100 activates a text inputting function for inputting a specific text. For the text inputting, the user selects the text inputting function from the menu function of the mobile terminal 100 or clicks a hot key when the hot key is assigned. When the text inputting function is activated, the mobile terminal 100, as shown in a screen 201, provides a screen such that the user inputs text on the entire surface of the touch screen by generating touch events. Then, the user draws a path, corresponding to a specific letter or number, on the touch screen using one of a touch-down event, a touch-move event, and a touch-up event. Then, the mobile terminal 100 outputs one of a letter and number corresponding to the touch event on the touch screen. In the drawing, the mobile terminal 100 outputs cursive letters corresponding to a letter image "Thank you" corresponding to the touch event of the user's.

When a user inputs a letter and one of a preset time has elapsed and an input signal corresponding to the letter input is generated, the mobile terminal 100 senses the letter drawn on the touch screen. Then, the mobile terminal 100, as shown in a screen 203, outputs a touch sensing result of an image input on a screen 201. However, the mobile terminal 100 may erroneously sense the cursive letter image on the screen 201 as "Thunk kou."

After the touch event is completely sensed, the mobile terminal 100 may activate the voice sensing function for collecting voice within a preset time and may collect voice signals corresponding to "Thank you" provided by the user as shown in the screen 203.

The mobile terminal 100 performs the voice sensing to "Thank you", corrects Thunk kou" sensed from the touch event according to the voice sensing data into "Thank you", and outputs the correct result to the touch screen as show in a screen 205. During the voice sensing, the mobile terminal 100 sets various candidates for "Thank you" and selects "Thank you" having the most similarity with "Thunk kou" sensed from the touch event.

As described above, in the inputting method according to an exemplary embodiment of the present invention, a touch event sensing result is obtained even when a sensed part has an error without setting text data candidates. The mobile terminal 100 reduces incorrectness generated during the voice sensing and the touch event sensing by selecting one voice sensing data from various voice sensing data candidates set during the voice sensing based on a result obtained by the touch event.

Figure 7:
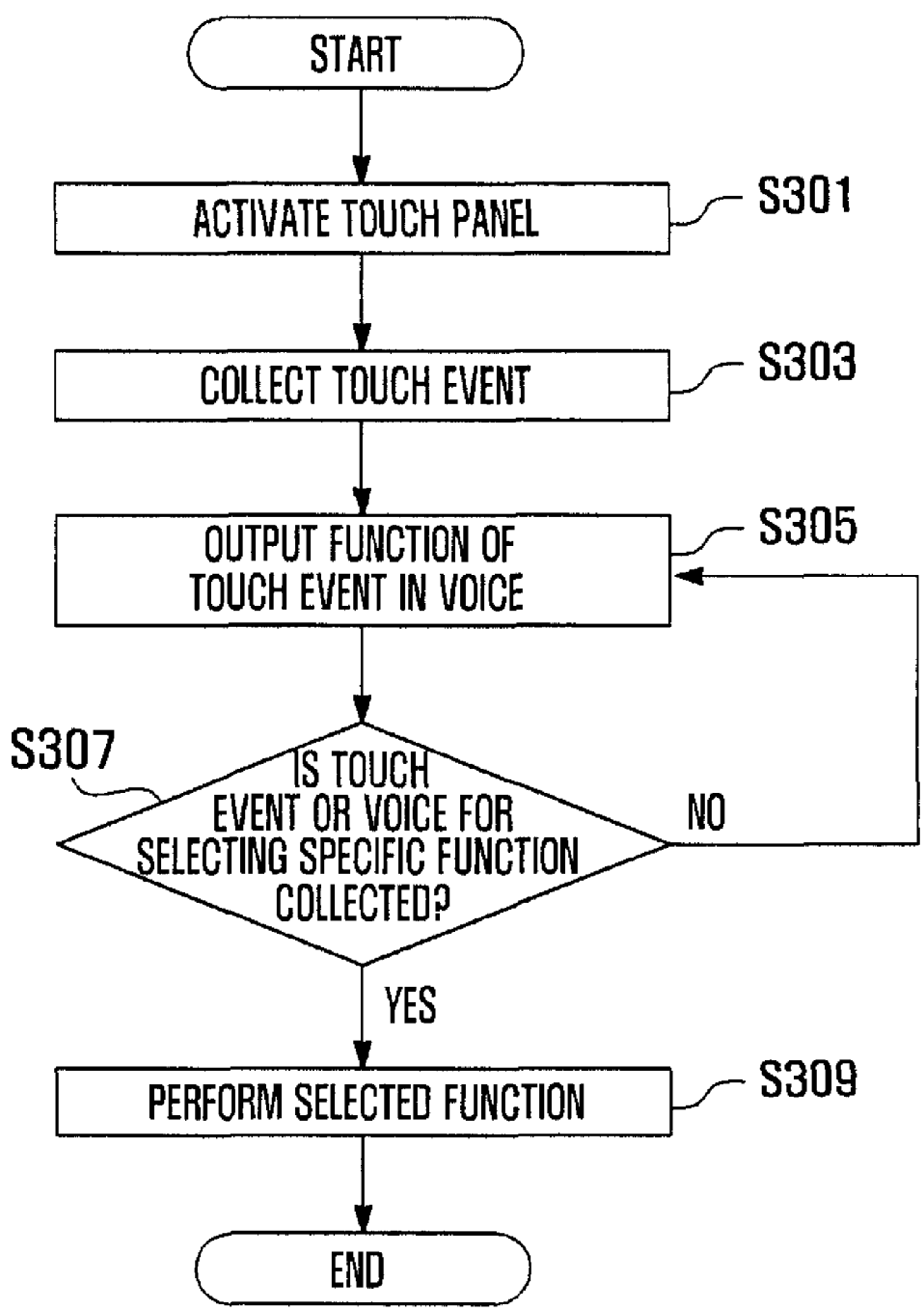
FIG. 7 is a flowchart illustrating an inputting method of a mobile terminal according to still another exemplary embodiment of the present invention.

FIG. 7 is a flowchart illustrating an inputting method of a mobile terminal according to still another exemplary embodiment of the present invention.

Referring to FIG. 7, in an inputting method of a mobile terminal according to still another exemplary embodiment of the present invention, firstly the mobile terminal 100 activates a touch panel 143 while preparing the mobile terminal 100 to enable a user to use the mobile terminal 100 by one of initializing the mobile terminal 100 or releasing a sleep state (S301). In this case, the mobile terminal 100 activates only the touch panel 143 included in a touch screen 140. That is, the mobile terminal 100 may activate the touch panel 143 only while keeping the display unit 141 turned off or activate the touch panel 143 and the display unit 141 simultaneously.

Next, the mobile terminal 100 may collect touch events generated at the activated touch panel 143 (S303). To this end, a user of the mobile terminal 100 touches the touch panel 143 with one of a finger and other tool.

When the touch events are collected, the mobile terminal 100 outputs a specific function in the form of sound based on the collected touch events. To this end, a user generates a touch event in a preset specific area on the display unit 141 such that a function on a user facility is output in sound. For example, when the display unit 141 is activated, the user may assign a touch event to an image corresponding to a specific user facility and the mobile terminal 100 may output voice information set to the assigned image. For example, when the image is assigned to a "calling function of RF unit functions" and the user generates a touch event on the image, the mobile terminal 100 outputs voice information such as "Do you perform a calling function?"

Next, the mobile terminal 100 checks whether a touch event for selecting or activating a specific function or voice is collected (S307). When the touch event or the voice collection is not generated, the mobile terminal 100 continuously performs a function of outputting description for a user facility according to a touch event in sound (S305).

When a touch event or voice for activating and selecting a specific user facility is collected (S307), the mobile terminal 100 performs the selected user facility (S309). In this case, the mobile terminal 100 performs the collection of the touch event and voice multiply or independently. In more detail, although voice information is output according to the user facility assignment or the voice information is completely output, the mobile terminal 100 activates a corresponding user facility when a touch event for activating the corresponding user facility on a specific image where the assignment is maintained, for example, a 'double tap' is generated. When a corresponding voice sensing is completed after voice corresponding to "execution" is collected from a user in a state when the voice information is being output or completely output according to the user facility assignment, the mobile terminal activates the assigned user facility based on the voice sensing data. The mobile terminal 100 may activate the corresponding user facility after both a touch event as an input signal for activating the user facility and the voice sensing is input. In this case, when the touch event and the voice sensing are performed one of simultaneously or sequentially within a preset time, the mobile terminal 100 activates the corresponding user facility.

In the above description, the term "assignment" may refer to a state when a user views an image output on the display unit 141, that is, a state before the user facility assigned to the image by highlighting edges of the image is activated. The term "selection" may refer to a state when the user facility assigned to the image is activated.

The inputting method according to still another exemplary embodiment of the present invention will be described in detail with reference to FIGS. 8 to 11.

Figure 8:
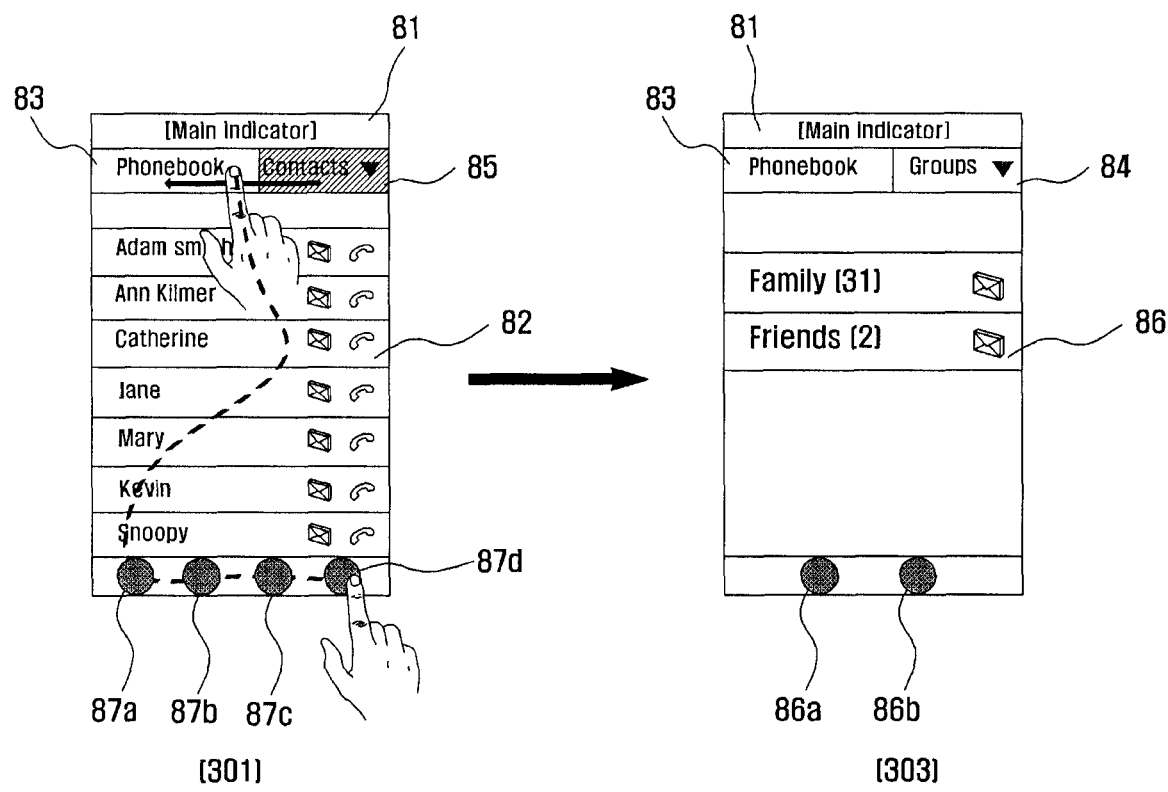
FIG. 8 is an exemplary screen illustrating a user facility and an activating method of the user facility in an inputting method of a mobile terminal according to still another exemplary embodiment of the present invention.

FIG. 8 shows an exemplary screen illustrating a user facility alarming and an activating method of the user facility in an inputting method of a mobile terminal according to still another exemplary embodiment of the present invention. Hereinafter, the user facility will be described by an example of a phone book function.

Referring to FIG. 8, the display unit 141, as shown in a screen 301, includes a main indicator area 81, a phone book area 83, a contact area 85, a list area 82, an eleventh menu area 87*a*, a twelfth area menu area 87*b*, a thirteenth menu area 87*c*, and a fourteenth menu area 87*d*. When the screen 301 is output, the mobile terminal 100 activates the touch panel 143 of the touch screen 140. The mobile terminal 100 sets one of voice signals to be output to the respective areas and text information to be convertible into voice signal. For example, when a user generates a touch event by touching the main indicator area 81 on the touch panel 143, the mobile terminal 100 outputs a preset voice signal indicating the touched area is the main indicator area 81 using the audio processor unit 130. Similarly, when a user generates a touch event by touching an area of the touch panel 143 where a specific item, for example, "Mary" is output in the list area 82, the mobile terminal 100 outputs a voice signal corresponding to the term "Mary" using the audio processor unit 130. At this time, the mobile terminal 100 uses the Text to Signal (TTS) function as a function of converting and outputting text information into a voice signal. The TTS function converts an input text letter into a preset voice signal and combining the voice signals to mechanically pronounce a specific word and sentence. Thus, the mobile terminal 100 assigns text information to the respective areas of the screen 301 and converts the text information into a voice signal when a corresponding area is selected.

In addition to a case when a user touches the respective areas of the display unit 141 individually, when the user generates touch events on a plurality of the areas sequentially, the mobile terminal 100 assigns voice signals corresponding to the sequential touch events. For example, when a user touches the phone book area 83 and moves a touching tool such as a finger or a stylus pen in a touch down state to perform a touch drag travelling list items, for example, from the item "Kevin" to the fourteenth menu area 87*d* via the items "Snoopy", the eleventh menu area 87*a*, the twelfth menu area 87*b*, and the thirteenth menu area 87*c*, the mobile terminal 100 outputs a preset voice signal assigned to the phone book area 83 such as "This is a phone book area." Moreover, the mobile terminal 100 outputs voice signals "This is Kevin." and "This is Snoopy." The mobile terminal 100 outputs a voice signal such as a voice "This is Create contact" assigned to a function assigned to the eleventh menu area 87*a* such as "Create contact" function. Similarly, when the twelfth menu area 87*b* is assigned to a "Delete" function and the thirteenth menu area 87*c* is assigned to a "More" function, the mobile terminal 100 outputs voice signals assigned to the respective menu areas 87*b* and 87*c* such as "This is a Delete function" and "This is a More function." Finally, when a touch event is generated in the fourteenth menu area 87*d*, the mobile terminal 100 outputs a voice signal "This is a Group view function." assigned to a function such as the "Group view" function corresponding to the fourteenth menu area 87*d*. The voice signal is output when a touch event is generated at a corresponding area. Thus, when the touch drag event travels through a specific area faster than a voice signal output for a preset time, outputting time of the voice signals corresponding to the respective areas may be overlapped. In this case, the mobile terminal 100 may prevent overlapping of the voice signals. That is, when a touch event is generated in another area while a touch event is generated and a corresponding voice signal is output, the mobile terminal 100 interrupts the output of a voice signal assigned to a previous area and outputs a voice signal assigned to an area where another touch event is currently being generated.

A user of the mobile terminal 100 may perform a preset voice input after hearing which user facilities are assigned to the respective areas in the screen 301 displayed on the display unit 141 through voice signals by generating touch events. That is, when a touch event is generated in the display unit 141 and the touch event is maintained in a specific area, the user may input a specific voice signal corresponding to a function assigned to the specific area, for example, the item "Group view" through the microphone MIC. Then, the mobile terminal 100 may compare text information of the area where the touch event is maintained and voice sensing data of the input voice signal to determine whether the text information is matched with the voice sensing data, and may shift from the screen 301 to a screen corresponding to the item "Group view" as shown in a screen 303 when the text information is matched with the voice sensing data. The screen 303 supports the item "Group view" and include areas selected from the group consisting of the main indicator area 81, the phone book area 83, a group area 84, a group list area 86, a twenty first menu area 86*a*, and a twenty second menu area 86*b*. The group area 84 indicates a screen generated based on the voice sensing data and the group list area 86 is provided to output group information classified and stored in a phone book. The twenty first menu area 86*a* and the twenty second menu area 86*b* support specific menu functions within the group view menu wherein the twenty first menu area 86*a* supports a "Create group" function and the twenty second menu area 86*b* supports the "Delete" function. In the Group view screen, as shown in the screen 301, voice signals or text information convertible into voice signals maybe assigned to the respective areas. Hereinbefore, when a voice sensing is generated in maintaining a touch event on a specific area, text information assigned to an area corresponding to the touch event is compared with voice sensing data, but the present invention is not limited thereto. In other words, when text information assigned to the fourteenth menu area 87*d* or a voice signal corresponding to a specific function is input after a touchup event is generated in an area when the touch event is completed, for example, the fourteenth menu area 87*d*, the mobile terminal 100 performs a menu corresponding to the fourteenth menu area 87*d*. Moreover, the mobile terminal 100 compares the voice sensing data with overall text data or voice signals assigned to areas through which the touch drag passes and may activate a user facility assigned to a corresponding area when there is text data or a voice signal corresponding to the voice sensing data.

As described above, when a touch event is generated already or currently in at least one area corresponding to a specific user facility in the display unit 141 and voice sensing data obtained by collecting voice is transmitted, the mobile terminal 100 determines whether at least text information or voice signal assigned to the at least one area is matched with the voice sensing data. When matched up, the mobile terminal 100 activates the user facility assigned to the area. By doing so, a touch event caused by an incomplete touching action and incorrect voice sensing are mutually compensated with each other so that a user facility can be executed exactly.

Figure 9:
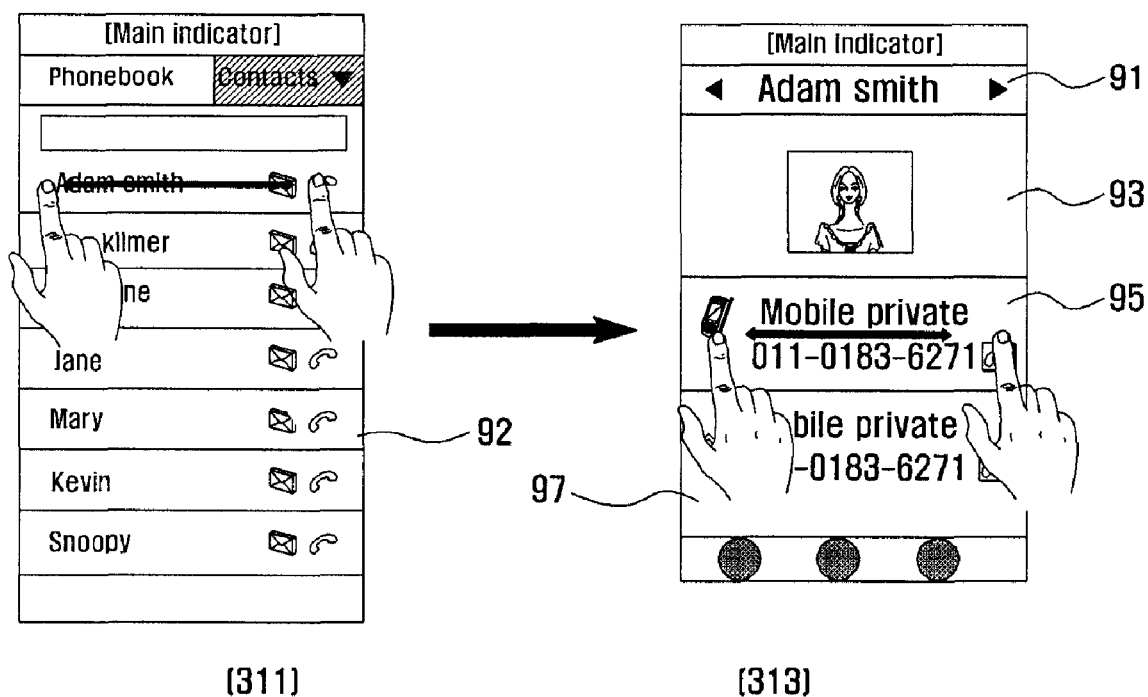
FIG. 9 is an exemplary screen illustrating a phone call inputting method of inputting method of a mobile terminal according to still another exemplary embodiment of the present invention.

FIG. 9 is an exemplary screen illustrating a phone call inputting method of the inputting method of a mobile terminal according to still another exemplary embodiment of the present invention. The phone call inputting method will be described with reference to a screen where the phone book function is activated. However, the present invention is not limited thereto but may be applied to a call log screen.

Referring to FIG. 9, when a user selects a specific receiver, for example "Adam Smith" from the list area 92 to which various items included in the phone book are output as shown in a screen 311, the mobile terminal 100 outputs a user facility executed based on the selected item as a voice signal. When a specific touch event sweeping right to left is generated at the item "Adam Smith," the mobile terminal 100 outputs a preset voice signal "This is Adam Smith."

After that, when the mobile terminal 100 senses a specific voice signal input by a user such as "View information" and outputs a screen 313 corresponding to the "View information." Referring to the screen 313, the mobile terminal 100 outputs a screen including any of a title area 91 corresponding to the item "Adam Smith", a photo area 93 when the phone book includes photos, a first phone number area 95 corresponding to the selected item, and a second phone number area 97.

In the screen 313, when the user wishes to call "Adam Smith," the user generates a specific touch event on the first phone number area 95 or the second phone number area 97, for example, a touch event sweeping right to left within a corresponding area. Then, the mobile terminal 100 performs a procedure of establishing a call based on a phone number assigned to the first phone number area 95 in response to the specific touch event.

The mobile terminal 100 searches for a specific item included in the phone book during the outputting of phone book information. To this end, the mobile terminal 100 provides a search window to a preset region of the display unit 141. Meanwhile, a user of the mobile terminal 100 generates a touch event sweeping a preset touch event such as the search window in the region at which the search window is generated. Then, the mobile terminal 100 outputs a voice signal "Item is searched for." In this case, when the user provides a voice signal corresponding to a name of the specific item such as "Adam Smith," the mobile terminal 100 senses the voice signal on the item "Adam smith" and reduces a voice sensing range and improve precision of the voice sensing by restricting the voice sensing range to the items stored in the phone book. The mobile terminal 100 senses the voice signal on a specific item and displays detailed information included in an item corresponding to the voice sensing data when the item is detected.

Although a specific touch event has been described by the right-to-left sweeping within a specific region, the present invention is not limited thereto. That is, a touch event may include any of a flick touch event, a plurality of tap touch events, and a long press touch event. When at least one touch event is generated in a corresponding area, the mobile terminal 100 activates a user facility assigned to the corresponding area.

As described above, when a specific voice signal is input after a touch event is generated at a specific area, the mobile terminal 100 executes a command corresponding to the voice signal. That is, when a touch event on a specific item is generated in one of the phone book and the call log and a voice signal is input, the mobile terminal 100 executes a specific command based on voice sensing data of the input voice signal. In this case, the mobile terminal outputs a voice signal set to an area where the touch event is one of generated and reproduced based on the text information corresponding to the voice sensing data.

Figure 10:
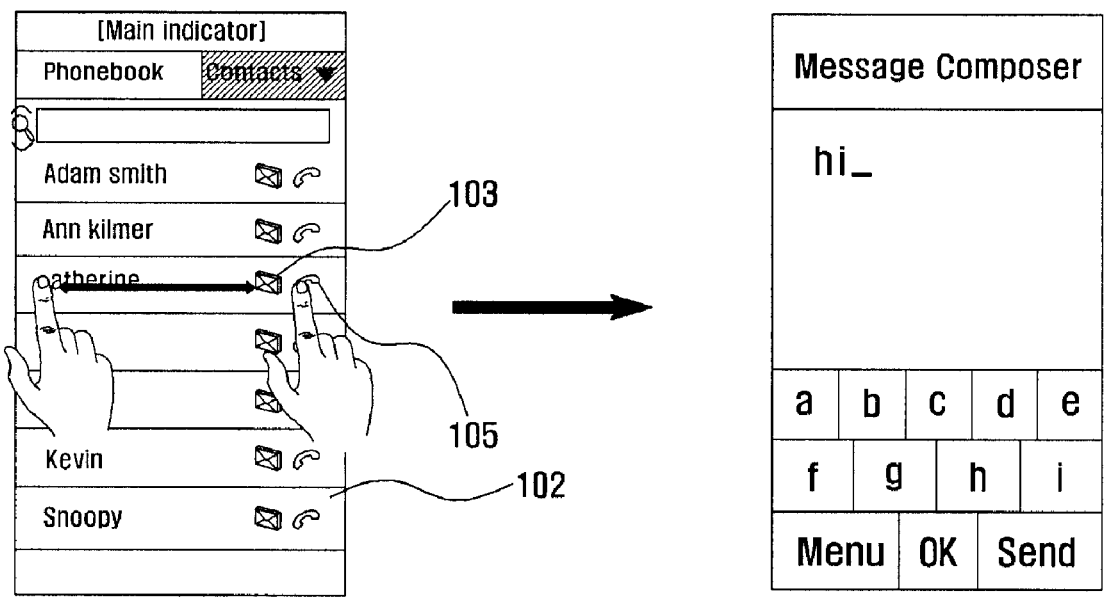
FIG. 10 is an exemplary screen illustrating a message composing method of an inputting method of a mobile terminal according to still another exemplary embodiment of the present invention.

FIG. 10 is an exemplary screen illustrating a message composing method of the inputting method of a mobile terminal according to still another exemplary embodiment of the present invention. Hereinafter, the message inputting method will be described by an example of a screen illustrating a phone book function. However, the present invention is not limited thereto but may be applied to various call-related screens including the call log screen, a message receiving screen, and a message sending screen.

Referring to FIG. 10, the mobile terminal 100 outputs a list area 102 of the phone book function as shown in a screen 321. A user of the mobile terminal 100 selects user information corresponding to a message receiver through a screen to which the list area 102 is output. For example, the user selects the item "Catherine" and performs a touch event including a message icon 103 to which a user facility shift is assigned when a specific user facility is used based on the selected item. That is, the user performs a touch event sweeping right to left in the area to which the item "Catherine" is output and moves the sweep touch event through the message icon 103. Then, the mobile terminal 100 senses the selections of the item "Catherine" and the message icon 103. Inn this case, the mobile terminal 100 outputs a voice signal assigned to the selection of the item "Catherine," for example, "This is Catherine." Moreover, the mobile terminal 100 outputs a voice signal corresponding to "Do you compose a message to Catherine?" according to the selections of the item "Catherine" and the message icon 103.

When the user gives an affirmative answer, for example generates a voice signal corresponding to "Yes", the mobile terminal 100 collects and senses the voice signal and outputs a message composing window as a screen 323.

In the above description, the user performs the touch event on the item "Catherine" and generates the touch event including the message icon assigned to a right side of the item, but the present invention is not limited thereto. In other words, when a touch event touching only the item "Catherine" regardless of inclusion of the message icon 103 into the touch event, the mobile terminal 100 outputs the voice signal, that is, the voice signal corresponding to "Do you compose a message to Catherine?" Meanwhile, when a touch event including the message icon 103 and a call icon is generated, the mobile terminal 100 outputs a voice signal such as "Message composing to and call to Catherine are enabled." When a voice signal corresponding to one of "Message composing" and "Phone calling" is received from a user, the mobile terminal 100 activates a user facility according to the voice signal. The mobile terminal 100 searches for voice sensing data corresponding to "Message composing" or "Phone calling" during the voice sensing of the voice signal so that a voice sensing range is reduced and it is clearly determined which user facility the voice sensing data assigns even when an error occurs. As described above, after a touch event is generated at a specific item including a phone number or when a specific voice signal is sensed while maintaining the touch event, the mobile terminal 100 executes a specific user facility based on the executed voice sensing data. Thus, the mobile terminal 100 restricts a voice sensing range to a range of user facilities executed based on an item assigned by a touch event so that possibility of imprecision occurring during the voice sensing can be reduced.

Figure 11:
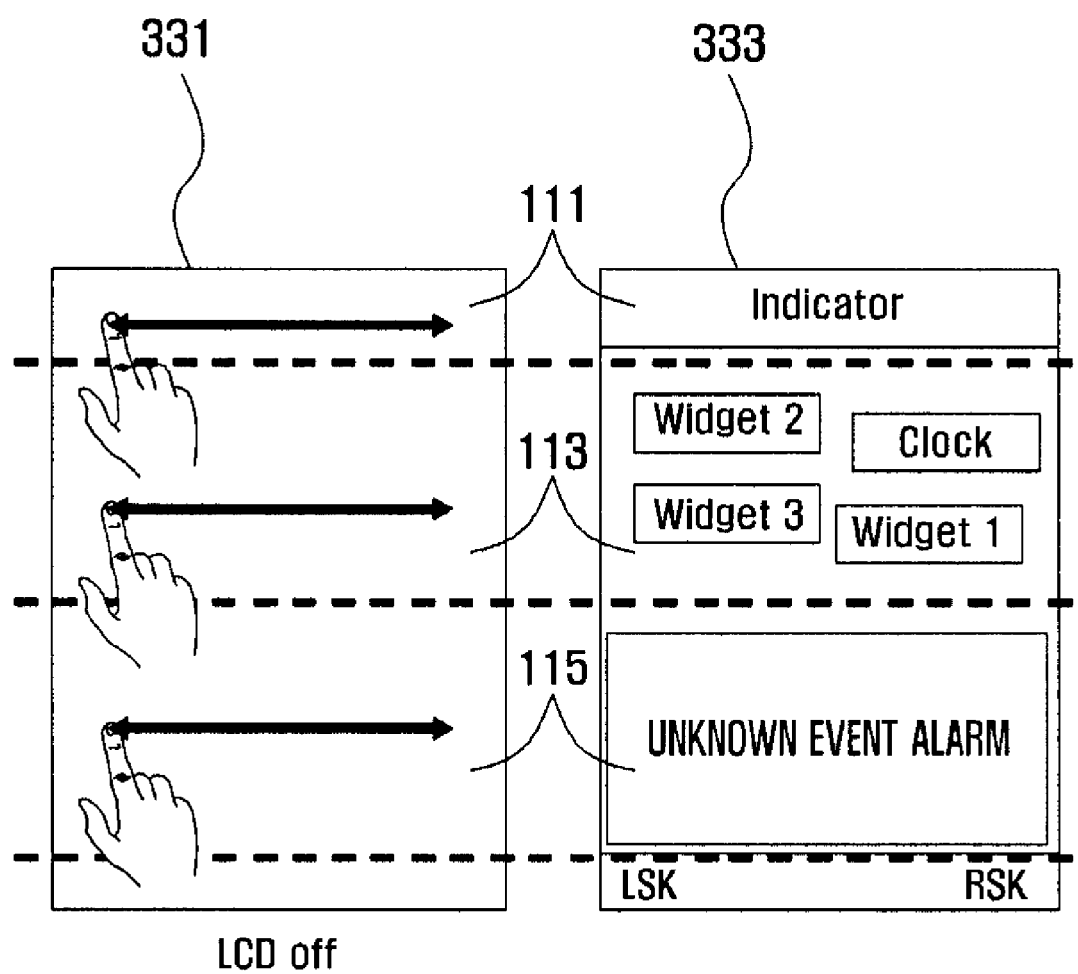
FIG. 11 is an exemplary screen illustrating a method of enabling a user facility on a touch panel in an inputting method of a mobile terminal according to still another exemplary embodiment of the present invention.

FIG. 11 is an exemplary screen illustrating a method of enabling a user facility on a touch panel in the inputting method of a mobile terminal according to still another exemplary embodiment of the present invention.

Referring to FIG. 11, a screen 331 indicates a state when electric power is not supplied to a display unit 141 but supplied to a touch panel 143 disposed in an upper side of the display unit 141 of the mobile terminal 100. A screen of the display unit 141, as shown in a screen 333, is divided into several regions of a preset size to which user facilities are assigned. Ina state where the screen 331 is displayed, when the display unit 141 is powered, the mobile terminal 100 output icons or images corresponding to the user facilities as shown in the screen 333.

The mobile terminal 100 divides the touch panel 143 activated in the state as shown in the screen 331 into the regions as shown in the screen 333. That is, the mobile terminal 100 divides the touch panel 143 as shown in the screen 331 into a first region 111, a second region 113, and a third region 115. The display unit 141 as shown in the screen 333 is divided into a first area 111, a second area 113, and a third area, wherein the first area 111 is an indicator area, the second area is a widget area, and the third area 115 is an unchecked event alarming area, for example.

In the screen 331, when a user generates a preset touch event at the first area 11, for example, a touch event sweeping right to left or other various touch events, the mobile terminal 100 outputs a preset voice signal assigned to a corresponding to the area. The mobile terminal 100 outputs information on a current status of an indicator at the first area 111. For example, when it is assumed that the first area 111 includes an indicator about remaining capacity of a battery and a touch event is generated at the first area 111, the mobile terminal 100 outputs a voice signal such as "This is an indicator area and current remaining capacity of battery is 80%." After that, when the user inputs a voice signal corresponding to "Check," the mobile terminal 100 supplies electric power to the display unit 141 such that the user may check the indicator area.

In a state as shown in the screen 331, when the user generates a preset touch event at the second area 113, the mobile terminal 100 may output description on a user facility assigned to the second area 113, for example, a preset voice signal such as "This is a widget area. Current time is 10:30 and widget 1 information, widget 2 information, and widget 3 information are serviced" and information serviced by the user facility assigned to the second area 113 in a voice signal.

In the state of the screen 331, when the user generates a preset touch event at the third area 115, the mobile terminal 100 outputs a user facility assigned to the third area 115, for example, a voice signal corresponding to "This is an unknown message reception alarming function", and may output a part of information on the unknown message reception as a voice signal when the unknown message is received. For example, when an unknown message of asking after a user is received from "Su-jan" and a preset touch event is generated at the third area 115, the mobile terminal 100 outputs a voice signal such as "This is an unknown message reception alarming function. A message is received from Su-jan. How are you? . . ." through the audio processor unit 130. In this case, the mobile terminal 100 may not output the voice signal "This is an unknown message reception alarming function" when the unknown message is received and further outputs a voice signal such as "Unknown message is not received" when unknown message is not received. Moreover, when the unknown message is received from "Su-jan", the mobile terminal 100 outputs all or a part of the unknown message in a voice signal at the state of the screen 331. When the user inputs a voice signal corresponding to "Check," the mobile terminal 100 may perform the voice sensing of the voice signal and output a message checking screen for checking the unknown message based on the voice sensing.

As described above, when a touch event is generated at an area of the touch panel even when the display unit is not powered, the mobile terminal according to the present invention outputs a voice signal corresponding to a user facility assigned to the area of the touch panel and performs the voice sensing function for activating the user facility. Therefore, the mobile terminal restricts a range of sensing a collected voice signal to a range of a user facility corresponding to an area where the touch event is generated, so that a database range for the voice sensing can be reduced and precision of the voice sensing can be improved.

Note that the above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein. Although exemplary embodiments of the present invention have been described in detail hereinabove, it should be understood that many variations and modifications of the basic inventive concept herein described, which may appear to those skilled in the art, will still fall within the spirit and scope of the exemplary embodiments of the present invention as defined in the appended claims.

What is claimed is:

1. An input processing method of a mobile terminal, comprising:
    collecting a touch event and a voice signal;
    sensing the voice signal to generate voice sensing data;
    generating visual information text data to determine a user facility corresponding to the touch event;
    correcting the voice sensing data by comparing the voice sensing data with the visual information text data and correcting the visual information text data by comparing the visual information text data with the voice sensing data; and
    performing the user facility based on the corrected voice sensing data and the corrected visual information text data.

2. The input processing method of claim 1, wherein the generation of the voice sensing data comprises:
    extracting at least one phoneme, syllable, word, and phrase which are included in the voice signal; and
    setting a plurality of voice sensing data including the at least one phoneme, syllable, word, and phrase as voice sensing data candidates.

3. The input processing method of claim 2, wherein, in the correction, voice sensing data most similar to the visual information text data is selected from the voice sensing data candidates.

4. The input processing method of claim 1, wherein the generation of the visual information text data comprises:
    collecting a plurality of text data determined by at least one touch event; and
    setting the plurality of text data as text data candidates.

5. The input processing method of claim 4, wherein, in the correction, text data most similar to the voice sensing data is selected from the text data candidates.

6. The input processing method of claim 1, wherein each of the voice sensing data and the visual information text data comprises any one of:

at least one letter and number for text input;
a command for activating the user facility.

7. The input processing method of claim 1, wherein the collecting step further comprises any one of:
   collecting the voice signal within a preset time after collecting the touch event; and
   collecting the touch event within a preset time after collecting the voice signal.

8. The input processing method of claim 1, wherein the collecting step further comprises maintaining the collected touch event after collecting both the touch event and the voice signal.

9. The input processing method of claim 1, further comprising:
   assigning voice information to preset areas of the touch panel; and
   outputting the voice information assigned to a corresponding area when the touch event is generated in at least one area of the touch panel.

10. The input processing method of claim 9, wherein, in the performance of the user facility, a user facility assigned to a corresponding area is performed when voice sensing data corresponding to the voice information is collected.

11. The input processing method of claim 9, wherein the voice information is provided in the form of preset text data and is converted into a voice signal to output.

12. An input processing device of a mobile terminal, comprising:
   a touch panel for generating a touch event;
   a microphone for collecting a voice signal;
   a control unit for sensing the voice signal to generate voice sensing data, generating visual information text data to determine a user facility corresponding to the touch event, comparing the voice sensing data with the visual information text data to correct the voice sensing data, and comparing the visual information text data with the voice sensing data to correct the visual information text data; and
   a display unit for outputting a screen corresponding to the user facility activated based on the corrected voice sensing data and the corrected visual information text data.

13. The input processing device of claim 12, wherein the control unit extracts at least one phoneme, a syllable, a word, and a phrase included in the voice signal and sets a plurality of voice sensing data having at least one extracted phoneme, word, syllable, and phrase as voice sensing data candidates.

14. The input processing device of claim 13, wherein the control unit selects voice sensing data having the highest similarity with the visual information text data from the voice sensing data candidates.

15. The input processing device of claim 12, wherein the control unit collects a plurality of text data determined from at least one touch event and sets the plurality of text data as text data candidates.

16. The input processing device of claim 15, wherein the control unit selects text data having the highest similarity with the voice sensing data from the text data candidates.

17. The input processing device of claim 12, wherein each of the voice sensing data and the visual information text data comprises any one of:
   at least one letter and number for inputting text; and
   a command for activating the user facility.

18. The input processing device of claim 12, further comprising:
   a storage unit for storing voice information assigned to preset areas of the touch panel; and
   an audio processor unit for outputting the voice information assigned to a corresponding area when the touch event is generated in at least one area of the touch panel.

19. The input processing device of claim 18, wherein the control unit performs a user facility assigned to a corresponding area when voice sensing data corresponding to the voice information is collected.

20. The input processing device of claim 18, wherein the audio processor unit converts the voice information in the form of preset text data into a voice signal when the voice signal is output.

* * * * *